(12) United States Patent
Zhao et al.

(10) Patent No.: US 12,426,534 B2
(45) Date of Patent: Sep. 30, 2025

(54) LAWN MOWER

(71) Applicant: Greenworks (Jiangsu) Co., Ltd., Jiangsu (CN)

(72) Inventors: Peng Zhao, Changzhou (CN); Jiafu Xue, Changzhou (CN); Hui Chen, Changzhou (CN); Zhizheng Ding, Changzhou (CN); Jing Wang, Changzhou (CN); Zhaochong Liu, Changzhou (CN); Kai Huang, Changzhou (CN)

(73) Assignee: Greenworks (Jiangsu) Co., Ltd., Changzhou (CN)

( * ) Notice: Subject to any disclaimer, the term of this patent is extended or adjusted under 35 U.S.C. 154(b) by 0 days.

(21) Appl. No.: 18/221,159

(22) Filed: Jul. 12, 2023

(65) Prior Publication Data
US 2023/0345863 A1    Nov. 2, 2023

Related U.S. Application Data

(63) Continuation of application No. 16/684,783, filed on Nov. 15, 2019, now abandoned.

(30) Foreign Application Priority Data

Nov. 26, 2018   (CN) .......................... 201811415924.2

(51) Int. Cl.
*A01D 34/00* (2006.01)
*B60L 50/60* (2019.01)
(Continued)

(52) U.S. Cl.
CPC ............ *A01D 34/006* (2013.01); *B60L 50/60* (2019.02); *B60L 58/10* (2019.02);
(Continued)

(58) Field of Classification Search
CPC ... A01D 34/006; A01D 2101/00; B60L 50/60; B60L 58/10; B60L 2240/545; B60L 2240/547; G05B 23/0259; G07C 5/08
See application file for complete search history.

(56) References Cited

U.S. PATENT DOCUMENTS 3,792,435 A * 2/1974 Pace ..................... B60R 25/104
340/429
3,835,362 A * 9/1974 Greene ................. H02J 7/0047
320/DIG. 19
(Continued)

FOREIGN PATENT DOCUMENTS

CN         101828464 A     9/2010
CN         104010879 A     8/2014
(Continued)

OTHER PUBLICATIONS

European Supplemental Search Report and Search Opinion in related European Patent Application No. 19211582.2 (EP3656202) dated Mar. 17, 2020; 6 pages.
(Continued)

*Primary Examiner* — Daniel Kessie
*Assistant Examiner* — Brian K Baxter

(57) ABSTRACT

The present invention provides a lawn mower comprising a battery system, a walking system and a cutter system. The lawn mower further comprises: a fault detection module, configured to detect if at least one of the battery system, walking system and cutter system has a fault; a fault determination module, configured to judge the fault level of the detected fault; and a control module, to control the current-limiting or outage of the corresponding battery system, the slowdown or stop of the walking system, as well as the slowdown or stop of the cutter system according to the fault level; compared with the prior art, the invention not only makes the fault detection more intelligent, but also the (Continued)

lawn mower can adjust the working state in real time according to the fault level, thereby improving the working efficiency.

8 Claims, 4 Drawing Sheets

(51) Int. Cl.
*B60L 58/10* (2019.01)
*G05B 23/02* (2006.01)
*G07C 5/08* (2006.01)
*A01D 101/00* (2006.01)

(52) U.S. Cl.
CPC ........... *G05B 23/0259* (2013.01); *G07C 5/08* (2013.01); *A01D 2101/00* (2013.01); *B60L 2240/545* (2013.01); *B60L 2240/547* (2013.01)

(56) References Cited

U.S. PATENT DOCUMENTS

| | | | | |
|---|---|---|---|---|
| 5,291,803 | A * | 3/1994 | Yamaguchi | B60W 10/06 477/902 |
| 5,475,695 | A * | 12/1995 | Caywood | G01R 31/31903 700/121 |
| 6,442,917 | B1 * | 9/2002 | Velke | A01D 34/6806 56/14.7 |
| 10,058,031 | B1 * | 8/2018 | Brown | B60K 17/14 |
| 10,111,378 | B2 * | 10/2018 | Yamagishi | H01M 10/486 |
| 10,919,463 | B1 * | 2/2021 | Brown | B60R 21/13 |
| 10,925,216 | B1 * | 2/2021 | Brown | B60K 17/00 |
| 11,130,409 | B1 * | 9/2021 | Bonny | B60L 15/20 |
| 11,608,073 | B2 * | 3/2023 | Smolyansky | G06F 11/16 |
| 2005/0241883 | A1 * | 11/2005 | Zuzuly | B66B 1/405 187/277 |
| 2007/0039304 | A1 * | 2/2007 | Wright | A01D 34/74 56/14.9 |
| 2008/0018269 | A1 * | 1/2008 | Wyatt | B62D 11/183 318/53 |
| 2008/0209877 | A1 | 9/2008 | Turner et al. | |
| 2009/0069964 | A1 | 3/2009 | Wyatt et al. | |
| 2011/0289896 | A1 * | 12/2011 | Sasahara | A01D 34/78 56/11.9 |
| 2013/0104509 | A1 * | 5/2013 | MacKinnon | A01D 34/78 701/22 |
| 2014/0062352 | A1 * | 3/2014 | Wang | H02P 5/68 318/139 |
| 2014/0136902 | A1 * | 5/2014 | Jung | G06F 11/0709 714/39 |
| 2014/0266664 | A1 * | 9/2014 | Dwyer | A01D 34/006 340/459 |
| 2014/0371979 | A1 * | 12/2014 | Drew | G05D 1/0044 701/418 |
| 2015/0007541 | A1 * | 1/2015 | Albinger | A01D 34/001 56/10.2 A |
| 2015/0109020 | A1 * | 4/2015 | Morino | G01R 31/52 324/764.01 |
| 2016/0020714 | A1 | 1/2016 | Wang et al. | |
| 2016/0366817 | A1 * | 12/2016 | Albinger | A01D 34/64 |
| 2017/0276572 | A1 * | 9/2017 | Chen | G01M 99/005 |
| 2017/0280621 | A1 | 10/2017 | Kawai et al. | |
| 2017/0335818 | A1 * | 11/2017 | Dwyer | F02N 11/101 |
| 2018/0338417 | A1 * | 11/2018 | Matsuda | A01D 34/006 |
| 2019/0011942 | A1 * | 1/2019 | Hsieh | H02J 7/02 |
| 2019/0021223 | A1 * | 1/2019 | Xu | A01D 34/69 |
| 2019/0208700 | A1 * | 7/2019 | Hahn | G05D 1/0248 |
| 2019/0339719 | A1 * | 11/2019 | Wang | B64D 45/00 |
| 2020/0047337 | A1 * | 2/2020 | Williams | B25J 9/1676 |
| 2020/0154638 | A1 * | 5/2020 | Chen | A01D 34/006 |
| 2021/0100166 | A1 * | 4/2021 | Becke | H01M 50/247 |

FOREIGN PATENT DOCUMENTS

| | | |
|---|---|---|
| CN | 106274498 A | 1/2017 |
| CN | 206313501 U | 7/2017 |
| CN | 107593088 A | 1/2018 |
| CN | 108001232 A | 5/2018 |
| DE | 102015108333 A1 | 12/2015 |
| EP | 2801248 A2 | 11/2014 |
| WO | 2016097891 A1 | 6/2016 |
| WO | 2017013602 A1 | 1/2017 |
| WO | 2018000922 A1 | 1/2018 |

OTHER PUBLICATIONS

Chinese First Office Action in related Chinese Patent Application No. 201811415924.2 dated Apr. 20, 2021; 9 pages.

Chinese Second Office Action in related Chinese Patent Application No. 201811415924.2 dated Oct. 13, 2021; 7 pages.

* cited by examiner

LAWN MOWER

CROSS-REFERENCE TO RELATED APPLICATIONS

This application is a continuation of U.S. application Ser. No. 16/684,783 filed on Nov. 15, 2019, which claims the priority of CN Application Serial No. 201811415924.2, filed on Nov. 26, 2018, the disclosures of which are hereby incorporated by reference in their entirety.

TECHNICAL FIELD

The present invention relates to a lawn mower.

BACKGROUND ART

Lawn mower is a dedicated equipment for mechanically mowing the lawn. Because it is a dedicated equipment, so the lawn mower will have a sharp blade. The sharp blade is in a high-speed rotation state when working. Therefore, in order to ensure safety, the lawn mower must be checked if there is a failure in real time manner, in case the sharp blade is still in high-speed rotation when a fault occurs, and this will cause a danger which is difficult to predict.

At present, when the mower experiences a failure, it is displayed through the instrument panel, reminding the operator to shut down for fault diagnosis, and shutting down directly in serious cases, without automatically detecting the fault and making corresponding actions, the intelligence of the lawn mower is poor.

In view of this, it is indeed necessary to make further improvements to the existing lawn mower to solve the above problems.

SUMMARY OF INVENTION

The object of the present invention is to provide a novel lawn mower which can detect faults and classify the detects faults into different level automatically in order to make corresponding actions based on the fault level.

To achieve the above objectives, the invention provides a lawn mower comprising a battery system, a walking system and a cutter system, and the lawn mower further comprising: a fault detection module, configured to detect if at least one of the battery system, walking system and cutter system has a fault respectively; a fault determination module, configured to judge the fault level of the detected fault; a control module, configured to control the current-limiting or outage of the corresponding battery system, the slowdown or stop of the walking system, as well as the slowdown or stop of the cutter system according to the fault level.

In some embodiments, said lawn mower further comprises a main controller, and said fault determination module and said control module are disposed on said main controller, fault detection module comprises a plurality of fault detection module provided in the battery system, the walking system and the cutter system respectively, to detect faults thereof respectively.

In some embodiments, when said fault detection module detects that said walking system has a fault, said fault detection module sends a fault code to the fault determination module through CAN communication to determine a fault level, and said control module sends a control command to the walking system through CAN communication according to the fault level to control said walking system to slow down or stop.

In some embodiments, when a minor fault occurs in the walking system, said control module sends a speed down command to said walking system through CAN communication to slow down the walking speed; when a severe fault occurs in the walking system, said control module sends a stop command to said cutter system through CAN communication, and simultaneously sends a throttle supply shutdown signal to said walking system, so that the lawn mower is in the mode: stop walking, and the cutter is not running.

In some embodiments, when said fault detection module detects that said cutter system has a fault, said fault detection module sends a fault code to the fault determination module through CAN communication to determine a fault level, and said control module sends a control command to the cutter system through CAN communication according to the fault level to control said cutter system to slow down or stop.

In some embodiments, when a minor fault occurs in the cutter system, said control module sends a speed down command to said cutter system through CAN communication to slow down the revolving speed of the cutter; when a severe fault occurs in the cutter system, said control module sends a stop command to said cutter system through CAN communication, so that the lawn mower is in the mode: normal walking, and the cutter is not running.

In some embodiments, said battery system is connected to said main controller through CAN communication to realize real-time transmission of a fault code and a control command, and said battery system has a discharge mode and a charging mode.

In some embodiments, when a minor fault occurs in said battery system in the discharge mode, said control module sends a current limiting command to said battery system, simultaneously sends a speed down command to said walking system, sends a stop command to the cutter system, to make the lawn mower in the mode: low speed walking, and the cutter is not running; when said battery system experiences a severe fault in the discharge mode, said control module sends a power-off command to the battery system, and simultaneously sends a stop command to said cutter system, and sends a throttle supply shutdown signal to said walking system, so that the mower is in the mode: stop walking, and the cutter is not running.

In some embodiments, when said battery system experiences a minor fault in the charging mode, said control module sends a current limiting command to the battery system, and controls a battery to continue charging; when said battery system experiences a severe fault in the charging mode, said control module sends a power-off command to said battery system, and cuts off the charging relay to stop a battery from charging.

In some embodiments, failures of said battery system in the discharge mode include the individual voltage is too low, the individual voltage difference is too high, the discharge temperature is too low, the discharge current is too high, the insulation resistance is too low, the master-slave MCU communication failure, the master-slave MCU hardware failure, and the feedback current is too high; failures of the battery system in the charging mode include the individual voltage is too high, the individual voltage difference is too high, the charging temperature is too high, the charging temperature is too low, the insulation resistance is too low, the master-slave MCU communication failure, and the master-slave MCU hardware failure.

The beneficial effects of the present invention are: as the lawn mower in the invention is provided with a fault detection module, a fault determination module and a control module, so that the lawn mower in the invention can perform automatic detection through a fault detection module, then perform a fault level determination through a fault determination module when the battery system, the walking system or the cutter system of the lawn mower have a fault, so that the control module can control the current-limiting or outage of the corresponding battery system, the slowdown or stop of the walking system, as well as the slowdown or stop of the cutter system; compared with the prior art, the invention not only makes the fault detection more intelligent, but also the lawn mower can adjust the working state in real time according to the fault level, thereby improving the working efficiency.

DESCRIPTION OF EMBODIMENTS

In order to make the objects, technical solutions and advantages of the present invention more clearly, the present invention will be described in detail below with reference to the drawings and specific embodiments.

The invention provides a lawn mower comprising a battery system, a walking system, a cutter system, and a control system for controlling the walking system and the cutter system. The battery system is configured to provide power to a lawn mower; said walking system is configured to drive the lawn mower to perform self-propelling, and the walking system comprises a walking wheel and a self-propelled motor for driving the walking wheel to self-propelled; said cutter system includes a cutter and a cutter motor for driving the cutter to rotate. Of course, said lawn mower further comprises other structures, such as a switch system, a control lever, a casing, etc., and since these structures are prior art, they will not be described in detail herein.

The lawn mower further comprises a fault detection module, a fault determination module and a control module, and the fault detection module, the fault determination module and the control module are electrically connected by CAN communication. The fault detection module is configured to detect if at least one of the battery system, walking system and cutter system has a fault respectively; the fault determination module is configured to judge the fault level of the detected fault; and the control module is configured to control the current-limiting or outage of the corresponding battery system, the slowdown or stop of the walking system, as well as the slowdown or stop of the cutter system according to the fault level.

It should be noted that, in this embodiment, the fault level is divided into a minor fault and a severe fault. Under a minor fault, the control module controls the battery system to limit the current, the walking system to reduce the speed by 20-80%, and the cutter system to reduce the speed by 20-80%. However, it does not affect the work of the entire mower; under severe faults, the control module controls the battery system to be powered off, the walking system to stop, the cutter system to stop, and the entire mower to stop working. Of course, the fault level may also include a medium fault. In this case, the working state of the lawn mower can be adjusted only by limiting the control command issued by the control module; at the same time, the ratio of the speed reduction of the walking system and the cutter system can be arbitrarily selected. There are no restrictions here.

Preferably, fault detection module comprises a plurality of fault detection module provided in the battery system, the walking system and the cutter system respectively, to detect faults thereof respectively; The fault determination module and the control module are provided in the control system to adjust/control the working state of the battery system, the walking system, and the cutter system.

Figure 1:
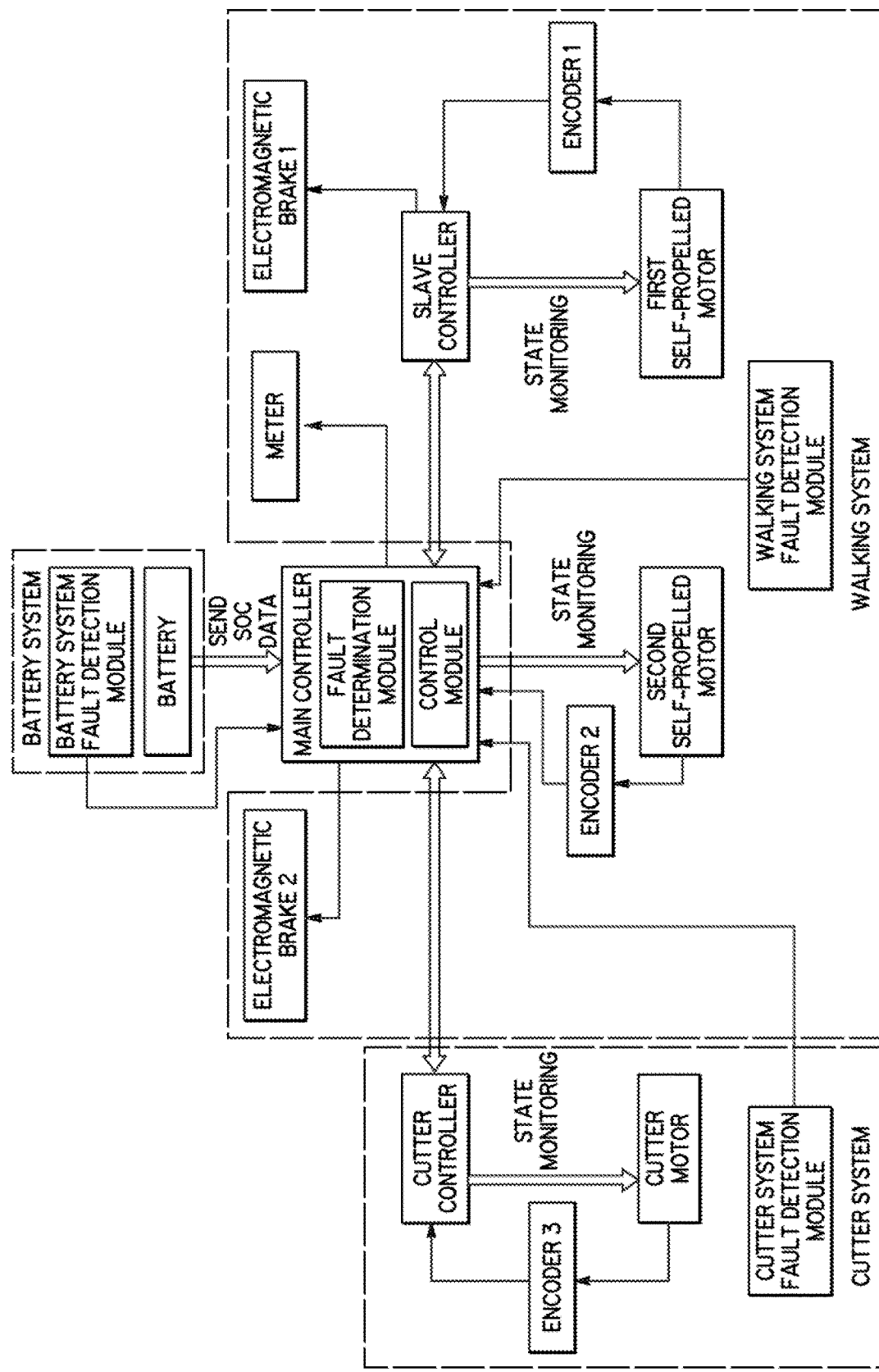
FIG. 1 is a control system diagram of the lawn mower of the present invention.

Referring to FIG. 1, the control system comprises a main controller, a slave controller and a cutter controller respectively connected to the main controller through CAN communication, and the fault determination module and the control module are disposed on the main controller. Specifically, the slave controller corresponds to the walking system, and the slave controller is configured to collect the state of the first self-propelled motor and the fault of the walking system in real time, and send the fault information to the control module in real time. The cutter controller corresponds to the cutter system, and the cutter controller is configured to collect the state of the cutter motor and the fault of the cutter system in real time, and send the fault information to the control module in real time. As the control core of the mower, the main controller is responsible for real-time acquisition of the state of the second self-propelled motor and the failure of the walking system, and on the other hand, collecting information of the battery system, the slave controller and the cutter controller, and the main controller will send the control command and status information to the cutter controller, the slave controller and the instrument after processing, to realize the running or stopping of the walking system and the cutter system, and also realize the real-time display of the whole machine state, and then realize the systematic protection of the whole machine.

When the fault detection module detects that the walking system has a fault, the fault detection module sends a fault code to the fault determination module through CAN communication to determine a fault level, and said control module sends a control command to the walking system through CAN communication according to the fault level to control the walking system to slow down or stop. Specifically, when a minor fault occurs in the walking system, the control module sends a speed down command to the walking system through CAN communication, the walking system reduces the walking speed by 20-80% according to the speed down command; when a severe fault occurs in the walking system, the control module sends a stop command to the cutter controller through CAN communication, the main controller and the slave controller close the throttle supply signal respectively, so that the walking speed of the mower is reduced to 0, and the electromagnetic brake 1 and electromagnetic brake 2 are released, at this time, the mower is in the mode: stop walking, and the cutter is not running.

The faults of the walking system include the failure of the main controller and/or the slave controller and the fault of the self-propelled motor. The faults of the self-propelled motor mainly include the over temperature of the motor, the stall of the motor, the abnormality of the encoder of the motor, and the open circuit of the motor; The main controller fault is the same as the slave controller fault, which mainly includes the controller's own fault and the user-defined fault. The controller's own fault mainly includes the working voltage abnormality, the working temperature abnormality, the motor overcurrent, the precharge abnormality, the input abnormality, the output abnormality and the communication abnormality; user-defined faults are mainly the additional protection functions based on the needs of the whole machine.

When the fault detection module detects that the cutter system has a fault, the fault detection module sends a fault code to the fault determination module through CAN communication to determine a fault level, and said control module sends a control command to the cutter system through CAN communication according to the fault level to control the cutter system to slow down or stop. Specifically, when a minor fault occurs in the cutter system, the control module sends a speed down command to the cutter system through CAN communication, the cutter system reduces revolving speed of the cutter by 20-80% according to the speed down command; when a severe fault occurs in the cutter system, the control module sends a stop command to the cutter controller through CAN communication, so that the lawn mower is in the mode: the walking system works normally and the cutter system does not work. At the same time, the meter displays a fault message to alert the user to troubleshooting.

The faults of the cutter system include the cutter motor fault, the cutter fault and the cutter controller fault. The cutter motor fault mainly includes the motor over temperature, the motor stall, the motor encoder abnormality, the circuit phase open circuit, etc.; the cutter controller fault mainly includes working voltage abnormality, working temperature abnormality, motor overcurrent, MOS tube abnormality, precharge abnormality, CAN communication abnormality and so on.

Since there are a plurality of cutters in the lawn mower, the cutter controller is also provided in plurality so that one cutter controller corresponds to one cutter. When any cutter fails (such as over temperature), the cutter controller can automatically detect and send the fault code to the fault determination module through CAN communication, after which the control module sends a stop command to all cutter controllers, controlling all cutters to stop working, to avoid the situation that the cutters does not work at the same time. At this time, the lawn mower is in the mode: the walking system works normally and the cutter system does not work.

In addition, under normal circumstances, the cutter controller will monitor the cutter speed, current, voltage and other information in real time, and send the information to the main controller in real time. If the main controller doesn't receive the message sent from the cutter controller in 2 s, the main controller can determine that the cutter controller is abnormal in communication, and the control module controls the lawn mower to enter the mode: the walking system works normally and the cutter system does not work.

The battery system is connected to said main controller through CAN communication to realize real-time transmission of a fault code and a control command. Because the battery system is the link between the battery and the user, the main purpose is to improve the utilization of the battery and prevent the battery from being overcharged and over-discharged. Therefore, the battery system has a discharge mode and a charging mode. Because the battery system has a fault self-detection function, so after the battery system receives the power-on signal/charge signal, the fault detection and level determination are automatically performed, and then the fault code is sent to the control module through the CAN communication, and the control module issues a corresponding control command.

Figure 2:
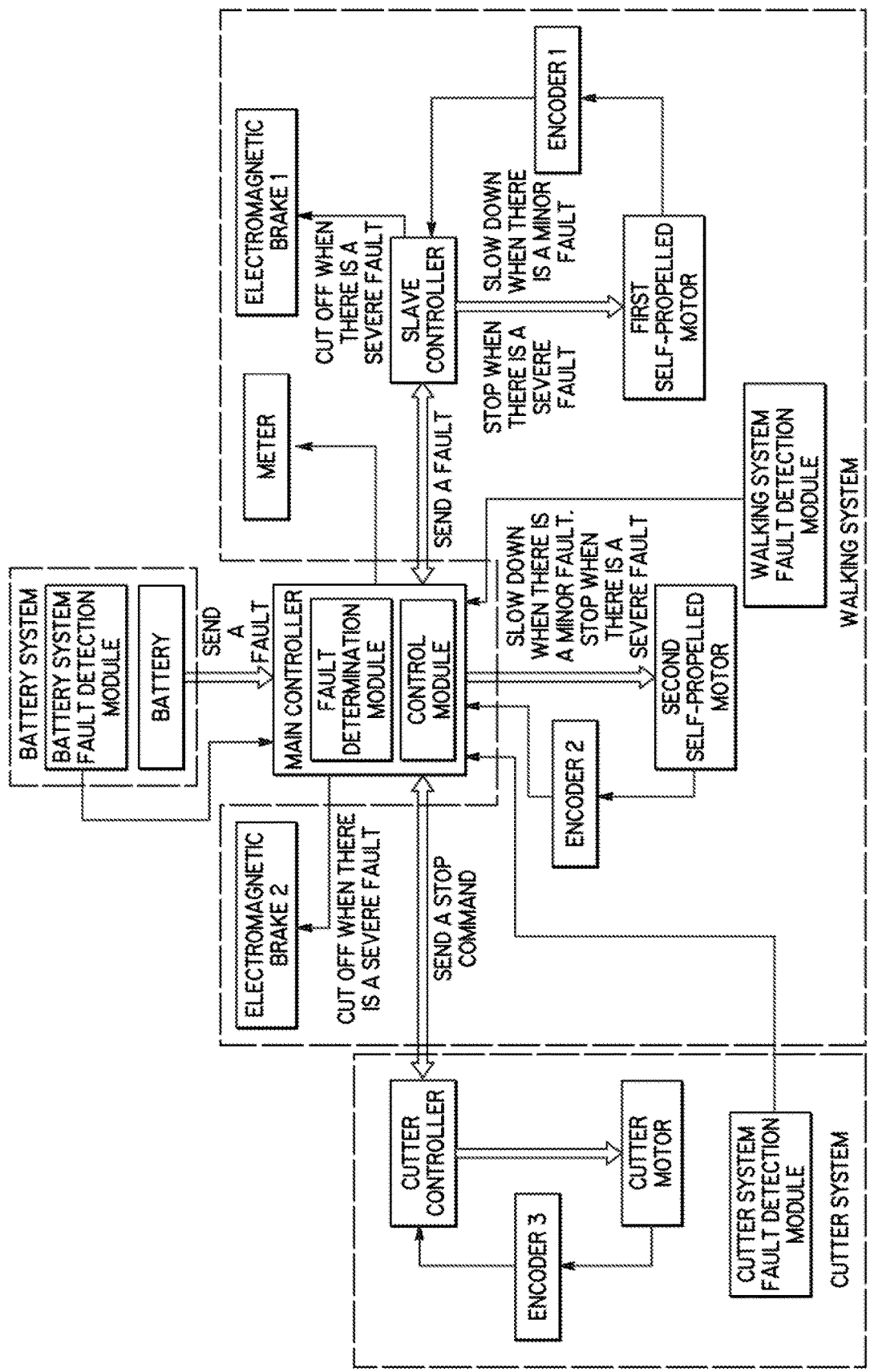
FIG. 2 is a control system diagram of the lawn mower in discharge mode.

Please refer to FIG. 2, in discharge mode, when a minor fault occurs in the battery system, the control module sends a current limiting command to the battery system, simultaneously sends a speed down command to the walking system, sends a stop command to the cutter system, to make the lawn mower in the mode: low speed walking, and the cutter is not running; when a severe fault occurs in the battery system, control module sends a power-off command to the battery system, and simultaneously sends a stop command to the cutter system, and sends a throttle supply shutdown signal to the walking system, so that the mower is in the mode: stopwalking, and the cutter is not running.

Specifically, when a minor fault occurs, the battery system sends a minor fault to the control module of the main controller through CAN communication. After receiving the fault, the control module sends the fault to the slave controller, and then the slave controller controls the corresponding first self-propelled motor and the main controller controls the corresponding second self-propelled motor, and controls the running speeds of the two self-propelled motors to the low speed mode, and the control module sends a stop command to the cutter controller to make the mower in the mode: low-speed walking, and the cutter is not running, thereby reducing the discharge current and preventing other abnormalities from been raised due to the a large discharge current when the battery has a failure.

When a severe fault occurs, the battery system sends the severe fault to the control module of the main controller through CAN communication. After receiving the fault, the control module sends the fault to the slave controller. At this time, the master controller and the slave controller respectively close the throttle supply signal to reduce the walking speed of the mower to 0, release the electromagnetic brake 1 and the electromagnetic brake 2, and the control module sends a stop command to the cutter controller, so that the mower is in the mode: stop walking, and the cutter is not running. And after 15 s, the relay inside the battery is cut off, so that the battery stops outputting.

Failures of said battery system in the discharge mode mainly include the individual voltage is too low, the individual voltage difference is too high, the discharge temperature is too low, the discharge current is too high, the insulation resistance is too low, the master-slave MCU communication failure, the master-slave MCU hardware failure, and the feedback current over high and other major failures; of course, it includes but not limiting to the above failures.

Figure 3:
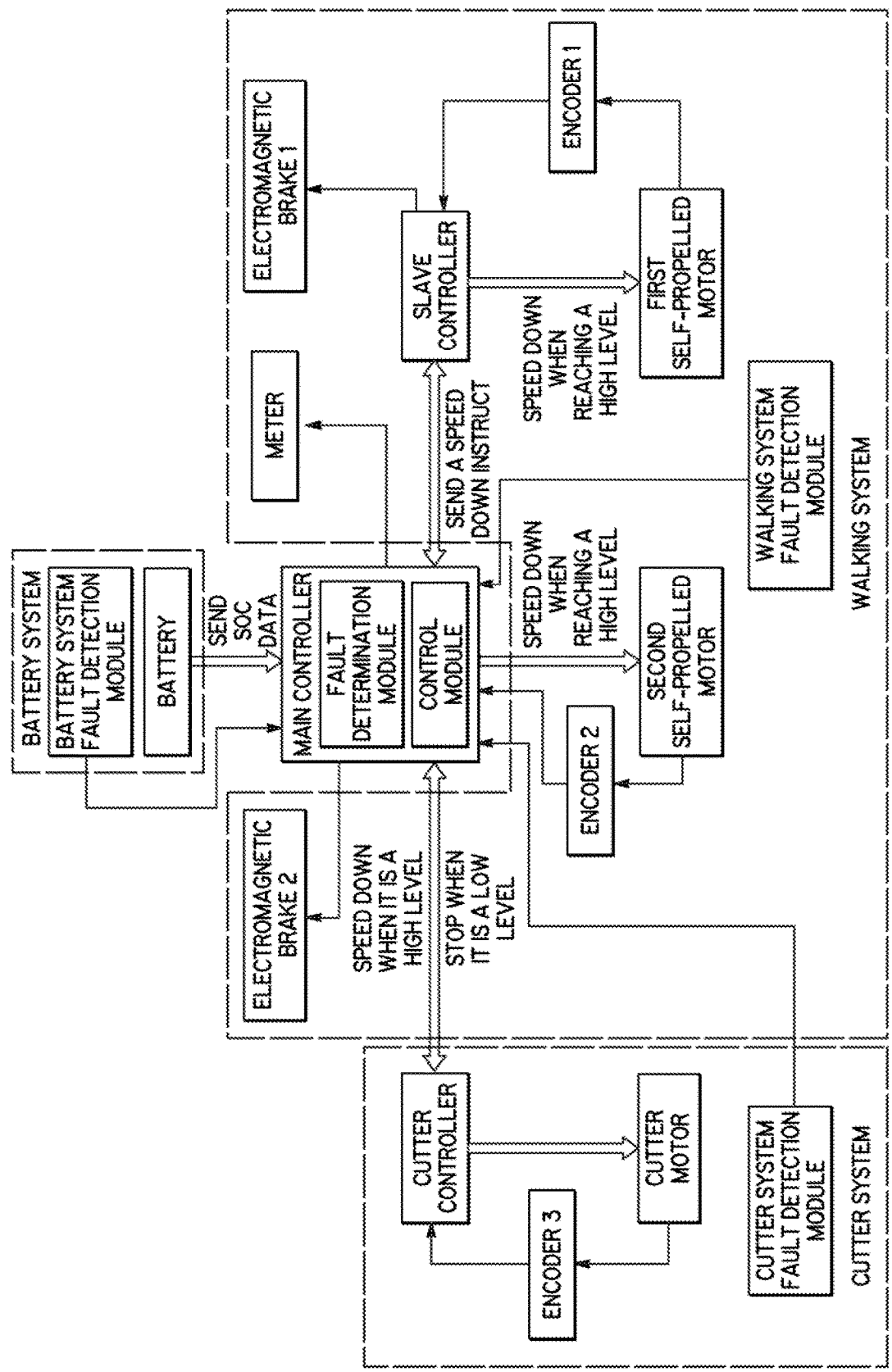
FIG. 3 is a control system diagram of the lawn mower in low power mode.

Please refer to FIG. 3, in the discharge mode, the battery system also has low-power protection function. Low-power protection mainly means that when the battery is in low power status, the mower reduces the operation power, and meter displays the battery power and flashes to remind the user to charge in time to prevent the mower from unable to walk due to excessive use, and prevent the battery from over-discharging, which affects the service life.

Low power of the battery is mainly divided into two grades, the high grade is 5% rated capacity of the battery, and the low grade is 2% of the rated capacity of the battery. When the remaining capacity of the battery is ≤5%, the control module of the main controller sends a low speed command to the cutter controller through CAN communication to slow down the cutter, and simultaneously sends a low speed command to the slave controller to reduce the walking speed. At the moment, the meter is flashing and the mower is in low power mode. When the remaining capacity of the battery is ≤2%, the control module of the main controller sends a low speed command to the slave controller through CAN communication to make the walking system remain in low speed status, and simultaneously sends a stop running command to the cutter controller to make the cutter stall. Thereby, the power consumption of the mower is further reduced, and the meter power is flashing, and the mower is in a charging preparation state.

Figure 4:
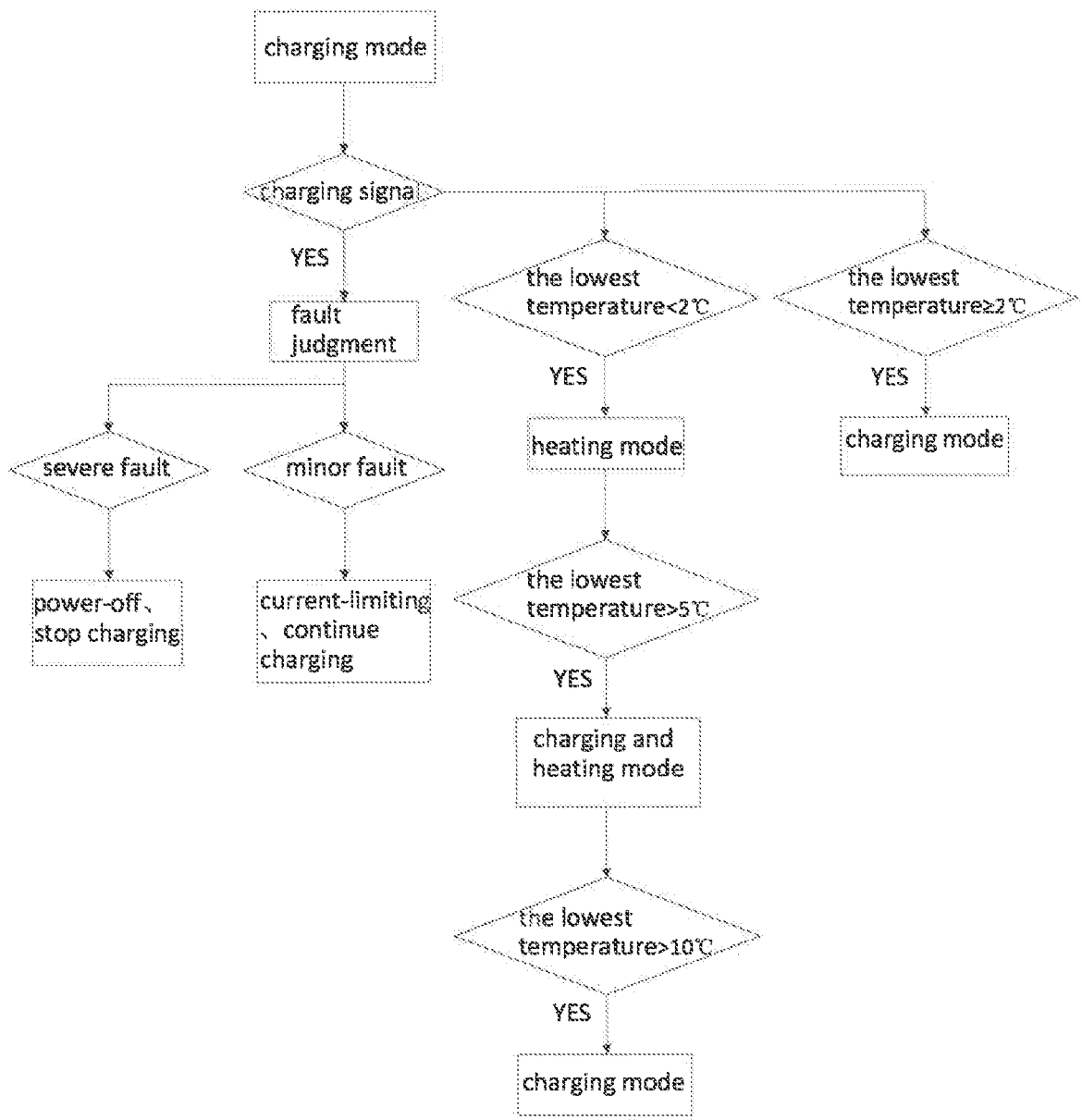
FIG. 4 is a flow diagram of the lawn mower in charging mode.

Please refer to FIG. 4, in the charging mode, when said battery system experiences a minor fault, the control module sends a current limiting command to the battery system, and controls a battery to continue charging; when the battery system experiences a severe fault, the control module sends a power-off command to the battery system, and cuts off the charging relay to stop a battery from charging.

Failures of said battery system in the charging mode mainly include the individual voltage is too high, the individual voltage difference is too high, the charging temperature is too high, the charging temperature is too low, the insulation resistance is too low, the master-slave MCU communication failure, the master-slave MCU hardware failure and other major failures.

In the charging mode, the battery system also has a heating protection function at low temperatures. The heating protection at low temperature is mainly to improve the temperature inside the battery by the heating module to reduce damage to the battery core due to low temperature charging, thereby prolonging the service life of the battery core. When the battery is ready to be charged, if the battery system detects that the lowest temperature in the battery box is higher than 2° C., the battery system sends a charging command to the charger, the charger starts to work, and the battery enters the charging mode; If the battery system detects that the lowest temperature in the battery box is lower than 2° C., the battery system sends a heating command to the charger, and at the same time closes the heating relay, and the battery enters the heating mode; when the temperature inside the battery box reaches 5° C., the battery system sends a charging command to the charger, and the battery enters a mode of charging while heating; when the temperature inside the battery box reaches 10° C., the charger enters the charging mode, the battery system disconnects the heating relay, closes the negative relay and the charging relay, and the battery enters the charging mode.

It should be noted that when the battery is ready to be charged, if it is detected that the lowest temperature in the battery box is higher than 2° C., it means that the external temperature at this time is suitable, and the charging mode can be directly entered. If it is detected that the lowest temperature in the battery box is lower than 2° C., it means that the external temperature at this time is very low, such as minus ten degrees, so the charger needs to be heated first, and the charger does not enter the charging mode at this time; when the temperature in the battery box reaches 2° C. (or 5° C.), if the heating is stopped at this time, the temperature in the battery box will directly drop below 2° C., thereby damaging the life of the battery, so it is necessary to continue heating the charger to ensure that the temperature does not drop, at this time the charger is charged while heating; when the temperature in the battery box reaches 10° C., it means that the temperature of the battery at this time is balanced with the external temperature. It is not necessary to continue heating, and the battery directly enters the charging mode.

In the present invention, taking the battery system as an example, for the level determination of minor faults and severe faults, please refer to the following table. When the battery status reaches the alarm threshold of each level and continues to exceed the "alarm delay", the battery system will report the corresponding level of alarm; when reporting the first level alarm (corresponding to a severe fault) and continues to exceed the "cutoff delay", the battery system will turn off the corresponding relay; when the parameter is configured as "/", the corresponding alarm and cut-off functions are disabled.

| Serial Number | Project | Set Value | Restore Value | Requirements | Alarm Delay | Cutout Delay | Fault Level |
|---|---|---|---|---|---|---|---|
| 1 | Upper Limit of Discharge Temperature 1 (° C.) | 52 | 47 | Set the upper limit of temperature threshold 1, alarm, the maximum discharge power is reduced to 50% | 2S | / | Minor Fault |
| 2 | Upper Limit of Discharge Temperature 2 (° C.) | 56 | / | Set the upper limit of temperature threshold 2, alarm, the maximum discharge power is reduced to 0%, cut off the high voltage after 15s delay | 2S | 15S | Severe Fault |
| 3 | Upper Limit of Charging Temperature 1 (° C.) | 50 | 45 | Set the upper limit of temperature threshold 1, alarm | 2S | / | Minor Fault |
| 4 | Upper Limit of Charging Temperature 2 (° C.) | 56 | / | Set the upper limit of temperature threshold 2, alarm, the | 2S | 15S | Severe Fault |

-continued

| Serial Number | Project | Set Value | Restore Value | Requirements | Alarm Delay | Cutout Delay | Fault Level |
|---|---|---|---|---|---|---|---|
| | | | | maximum feedback power is reduced to 0% | | | |
| 5 | Lower Limit of Discharge Temperature 1 (° C.) | −15 | −10 | Set the lower limit of temperature threshold 1, alarm, the maximum discharge power is reduced to 50% | 2S | / | Minor Fault |
| 6 | Lower Limit of Discharge Temperature 2 (° C.) | −20 | / | Set the lower limit of temperature threshold 2, alarm, the maximum discharge power is reduced to 0%, cut off the high voltage after 15s delay | 2S | 15S | Severe Fault |
| 7 | Lower Limit of Charging Temperature 1 (° C.) | 5 | 10 | Set the lower limit of temperature threshold 1, alarm | 5S | / | Minor Fault |
| 8 | Lower Limit of Charging Temperature 2 (° C.) | 2 | / | Set the lower limit of temperature threshold 2, alarm, the maximum charging power is reduced to 0%, cut off the charging loop after 1s delay | 5S | 1S | Severe Fault |
| 9 | Individual voltage difference is too high 1 (V) | 0.5 | 0.3 | The maximum voltage imbalance value allowed between all cabinets 1, alarm, the maximum discharge power is reduced to 50%. | 2S | / | Minor Fault |
| 10 | Individual Voltage difference is too high 2 (V) | 0.7 | / | The maximum voltage imbalance value allowed between all cabinets 2, alarm, the maximum discharge power is reduced to 0%, cut off the high voltage after 15s delay | 2S | 15S | Severe Fault |
| 11 | Battery temperature difference is too large 1 (° C.) | 12 | 7 | The maximum temperature imbalance value allowed between all cabinets 1, alarm, the maximum discharge | 2S | / | Minor Fault |

-continued

| Serial Number | Project | Set Value | Restore Value | Requirements | Alarm Delay | Cutout Delay | Fault Level |
|---|---|---|---|---|---|---|---|
| | | | | power is reduced to 50%. | | | |
| 12 | Battery temperature difference is too large 2 (° C.) | 15 | / | Alarm, the maximum discharge power is reduced to 0%, cut off the high voltage after 15s delay | 2S | 15S | Severe Fault |
| 13 | Individual voltage is too high 1 (V) | 3.65 | 3.6 | The maximum individual voltage allowed in the battery 1, alarm, the maximum discharge power is reduced to 50% | 2S | / | Minor Fault |
| 14 | Individual voltage is too high 2 (V) | 3.7 | / | The maximum individual voltage allowed in the battery 2, alarm, the maximum discharge power is reduced to 0%, cut off the high voltage after 5s delay | 2S | 5S | Severe Fault |
| 15 | Individual voltage is too low 2 (V) | 2.8 | / | The minimum individual voltage allowed in the battery 2, alarm, the maximum discharge power is reduced to 0%, cut off the high voltage after 15s delay | 2S | 15S | Severe Fault |
| 16 | Charging current is too high 1 (A) | 35 | 30 | The maximum current allowed when charging 1, alarm, the maximum charging power is reduced to 50%. | 2S | / | Minor Fault |
| 17 | Charging current is too high 2 (A) | 40 | / | The maximum current allowed when charging 2, alarm, the maximum charging power is reduced to 0%, cut off the high voltage after 15s delay | 2S | 15S | Severe Fault |
| 18 | Discharge current is too high 1 (A) | 250 | 200 | The maximum current allowed when discharging 1, alarm, the maximum discharging power and feedback | 2S | / | Minor Fault |

-continued

| Serial Number | Project | Set Value | Restore Value | Requirements | Alarm Delay | Cutout Delay | Fault Level |
|---|---|---|---|---|---|---|---|
| | | | | power are reduced to 50%. | | | |
| 19 | Discharge current is too high 2 (A) | 270 | / | The maximum current allowed when discharging 2, alarm, the maximum discharging power is reduced to 0%, cut off the high voltage after 3s delay | 2S | 3S | Severe Fault |
| 20 | Minor insulation faults (KΩ) | 40 | 100 | Alarm, the maximum discharging power and feedback power are reduced to 80%. | 60S | / | Minor Fault |
| 21 | Severe insulation fault (KΩ) | 10 | / | Alarm, the maximum discharge power and feedback power is reduced to 0%, cut off the high voltage after 15s delay, if the power is being self-tested, high voltage is not allowed. | 60S | 15S | Severe Fault |
| 22 | Battery system internal master-slave communication fault | 5s | / | Alarm, the maximum discharge power and feedback power is reduced to 0%, cut off the high voltage after 30s delay | 5S | 30S | Severe Fault |
| 23 | Battery system self-test hardware fault | 2s | / | Alarm, the maximum discharge power and feedback power is reduced to 0%, cut off the high voltage after 15s delay | 2S | 15S | Severe Fault |
| 24 | Feedback current is too high 1 (A) | 80 | 50 | The maximum feedback current allowed when discharging 1, alarm, the maximum discharging power and feedback power are reduced to 50%. | 2S | / | Minor Fault |
| 25 | Feedback current is too high 2 (A) | 100 | / | The maximum feedback current allowed when discharging 2, | 2S | 15S | Severe Fault |

| Serial Number | Project | Set Value | Restore Value | Requirements | Alarm Delay | Cutout Delay | Fault Level |
|---|---|---|---|---|---|---|---|
| | | | | alarm, the maximum discharging power is reduced to 0%, cut off the high voltage after 15s delay | | | |

Of course, for the determination rules of the fault level of the walking system and the cutter system, please set by referring to the above table, which is not limited herein.

In conclusion, the beneficial effects of the present invention are: as the lawn mower in the invention is provided with a fault detection module, a fault determination module and a control module, so that the lawn mower in the invention can perform automatic detection through a fault detection module, then perform a fault level determination through a fault determination module when the battery system, the walking system or the cutter system of the lawn mower have a fault, so that the control module can control the current-limiting or outage of the corresponding battery system, the slowdown or stop of the walking system, as well as the slowdown or stop of the cutter system; compared with the prior art, the invention not only makes the fault detection more intelligent, but also the lawn mower can adjust the working state in real time according to the fault level, thereby improving the working efficiency.

The above embodiments are only used to illustrate the technical solutions of the present invention, not for limitation. Although the present invention is described in detail with reference to the preferred embodiments, ordinary technicians in the field should understand that the technical solutions of the present invention may be modified or substituted without departing from the spirit and scope of the technical solutions of the present invention.

What is claimed is:

1. A lawn mower comprising:
a battery system including a battery, a battery box housing the battery, and a battery fault detection module configured to detect faults in the battery system;
a walking system including a walking system fault detection module configured to detect faults in the walking system;
a cutter system including a cutter system fault detection module configured to detect faults in the cutter system, wherein the cutter system comprises a plurality of cutters and each cutter from the plurality of cutters is configured with a cutter controller, wherein each of the cutter controller is configured to send fault codes to a fault determination module and to receive control instructions from a control module;
the fault determination module, communicatively connected to the battery fault detection module, and the cutter system fault detection module, and configured to receive fault codes from the battery fault detection module, and the cutter system fault detection module and make a fault level determination based on the detected faults in the battery system and the cutter system,
wherein the fault level determination is classified into one of a minor fault or a severe fault based on an alarm threshold associated with each fault level of the battery system, the walking system, and the cutter system; and
the control module communicatively connected to the battery system, the walking system, the cutter system, and the fault determination module;
wherein, the control module is configured to control the cutter system to reduce speed by 20-80% when the fault determination module determines that the fault level is the minor fault,
the control module is configured to control the cutter system to stop when the fault determination module determines that the fault level is the severe fault, wherein the walking system operates in a normal walking mode even after the fault level of the cutter system is at least one of the minor fault or the severe fault.

2. The lawn mower according to claim 1, wherein the battery system comprises a discharge mode in which the lawn mower is in a low power state when the remaining battery power is less than a first threshold, the lawn mower is in a charge ready state when the remaining battery power is less than a second threshold, and the first threshold is greater than the second threshold.

3. The lawn mower according to claim 1, wherein the battery system comprises a discharge mode in which the lawn mower is in a low power state when the remaining battery power is <5% of rated capacity and the lawn mower is in a charge ready state when the remaining battery power is <2% of rated capacity.

4. The lawn mower according to claim 1, wherein the battery system comprises a charging mode, and
when the battery system is in the charging mode, the battery system is in a normal charging mode state when the battery system detects that the minimum temperature inside the battery box is higher than a first temperature preset value.

5. The lawn mower according to claim 4, wherein the first temperature preset value is 2° C.

6. The lawn mower according to claim 1, wherein the battery system further comprises a charging mode with a heating protection function;
wherein when the battery is ready to be charged:
(i) when the battery system detects that the lowest temperature inside the battery box is lower than a first temperature preset value, the battery enters a heating mode,
(ii) when the temperature inside the battery box reaches a second temperature preset value, the second temperature preset value being higher than the first temperature preset value, the battery enters a heating and charging mode, and
(iii) when the temperature inside the battery box reaches a third temperature preset value, the third temperature preset value being higher than the second temperature preset value, the battery enters a charging mode.

7. The lawn mower according to claim 6, wherein the first temperature preset value is 2° C. and the third temperature preset value is 10° C.

8. The lawn mower according to claim 1, wherein the detected faults in the battery system using the battery system fault detection module, in a discharge mode and a charging mode comprises at least one of individual voltage, individual voltage difference, a discharge temperature, a discharge current, a charging temperature, an insulation resistance, a master-slave MCU communication failure, the master-slave MCU hardware failure, a feedback current, or a combination thereof;

wherein the detected faults in the cutter system using the cutter system fault detection module comprises at least one of a cutter fault, a cutter motor fault including the cutter motor over temperature, the cutter motor stall, the cutter motor encoder abnormality, a circuit phase open circuit, or a combination thereof, and the cutter controller fault including working voltage abnormality, working temperature abnormality, motor overcurrent, MOS tube abnormality, precharge abnormality, Controller Area Network (CAN) communication abnormality, or a combination thereof.

* * * * *